(12) United States Patent
Lin

(10) Patent No.: US 7,870,696 B2
(45) Date of Patent: Jan. 18, 2011

(54) PANEL ASSEMBLY FOR DECORATION GLASS

(76) Inventor: Chia-Yen Lin, 6F, No. 82, Sec. 2, Jian-Guo N. Road, Taipei (TW)

( * ) Notice: Subject to any disclaimer, the term of this patent is extended or adjusted under 35 U.S.C. 154(b) by 141 days.

(21) Appl. No.: 11/845,784

(22) Filed: Aug. 28, 2007

(65) Prior Publication Data

US 2009/0056247 A1 Mar. 5, 2009

(51) Int. Cl.
*E06B 7/00* (2006.01)
(52) U.S. Cl. .................. 52/204.59; 52/311.1
(58) Field of Classification Search ............. 428/38, 428/13; 52/204.59, 204.591, 204.61, 204.51, 52/204.54, 211, 455, 311, 384, 386, 387, 52/389
See application file for complete search history.

(56) References Cited

U.S. PATENT DOCUMENTS

| | | | | |
|---|---|---|---|---|
| 260,559 A * | 7/1882 | Fowler, Jr. | ............... | 160/379 |
| 286,434 A * | 10/1883 | Herzog | ............... | 428/38 |
| 2,991,213 A * | 7/1961 | Williams | ............... | 156/304.3 |
| 3,064,380 A * | 11/1962 | Baut et al. | ............... | 428/38 |
| 3,183,140 A * | 5/1965 | Gibson, Jr. | ............... | 428/38 |
| 3,420,728 A * | 1/1969 | Haverstock | ............... | 428/38 |
| 3,420,925 A * | 1/1969 | Sharif | ............... | 264/102 |
| 3,512,320 A * | 5/1970 | Choquette et al. | ............... | 52/172 |
| 3,516,893 A * | 6/1970 | Gerard | ............... | 428/155 |
| 3,680,225 A * | 8/1972 | Ishida | ............... | 434/84 |
| 3,713,958 A * | 1/1973 | McCracken | ............... | 428/38 |
| 3,815,263 A * | 6/1974 | Oberwager | ............... | 434/84 |
| 3,931,425 A * | 1/1976 | Kuroda | ............... | 428/38 |
| 4,009,309 A * | 2/1977 | Holt | ............... | 428/38 |
| 4,223,499 A * | 9/1980 | Schrunk | ............... | 52/308 |
| 4,252,847 A * | 2/1981 | DelGrande | ............... | 428/38 |
| 4,302,260 A * | 11/1981 | Meltzer | ............... | 156/63 |
| 4,318,946 A * | 3/1982 | Pavone | ............... | 428/34 |
| 4,610,901 A * | 9/1986 | Linscott | ............... | 428/38 |
| 4,889,572 A * | 12/1989 | Danico et al. | ............... | 156/63 |
| 4,904,513 A * | 2/1990 | De Nicolo | ............... | 428/46 |
| 4,963,407 A * | 10/1990 | Detweiler et al. | ............... | 428/47 |
| 5,003,745 A * | 4/1991 | Fang | ............... | 52/316 |
| 5,033,249 A * | 7/1991 | Scheeren et al. | ............... | 52/786.13 |
| 5,102,706 A * | 4/1992 | Latte | ............... | 428/38 |
| 5,134,004 A * | 7/1992 | Moline | ............... | 428/38 |
| 5,161,343 A * | 11/1992 | Edwards et al. | ............... | 52/455 |
| 5,205,884 A * | 4/1993 | Rauscher | ............... | 156/63 |
| 5,259,161 A * | 11/1993 | Carter | ............... | 52/307 |
| 5,269,858 A * | 12/1993 | Silverman | ............... | 156/62 |
| 5,417,020 A * | 5/1995 | Dobija | ............... | 52/235 |
| 5,418,021 A * | 5/1995 | Kim | ............... | 428/14 |
| 5,497,588 A * | 3/1996 | Martin et al. | ............... | 52/208 |
| 5,501,888 A * | 3/1996 | Hanson et al. | ............... | 428/38 |
| 5,640,818 A * | 6/1997 | Wirkus et al. | ............... | 52/306 |

(Continued)

*Primary Examiner*—Richard E Chilcot, Jr.
*Assistant Examiner*—James Ference

(57) ABSTRACT

A panel assembly for decoration glass is disclosed herein, which is to be attached to a side of a pane of transparent glass. The panel assembly includes a panel piece and at least one embedding piece. The panel piece is a thin plate and has at least one through hole. The embedding piece is corresponding to and fitted in the through hole. The embedding pieces are configured as a pattern or a character and have various colors. When the panel assembly is attached to the glass, it gives the glass a vivid appearance. The individual embedding pieces or the whole panel assembly may be replaced with other colors or patterns to make the glass present a diverse appearance.

12 Claims, 8 Drawing Sheets

U.S. PATENT DOCUMENTS

| | | | |
|---|---|---|---|
| 5,884,441 A * | 3/1999 | Monroe et al. | 52/204.59 |
| 5,907,937 A * | 6/1999 | Loftus et al. | 52/308 |
| 5,989,666 A * | 11/1999 | Hadden | 428/38 |
| 6,131,345 A * | 10/2000 | Pelusio | 52/204.59 |
| 6,272,801 B1 * | 8/2001 | Suh | 52/211 |
| 6,319,009 B1 * | 11/2001 | Radgens | 434/81 |
| 6,640,510 B2 * | 11/2003 | Kane | 52/204.59 |
| 6,659,097 B1 * | 12/2003 | Houston | 125/12 |
| 6,905,094 B2 * | 6/2005 | Dazet et al. | 244/129.3 |
| 7,021,304 B1 * | 4/2006 | Houston | 125/12 |
| 7,343,714 B2 * | 3/2008 | Zocco | 52/204.59 |

* cited by examiner

PANEL ASSEMBLY FOR DECORATION GLASS

BACKGROUND OF THE INVENTION

1. Field of the Invention

The present invention relates generally to a panel assembly with a pattern thereon, and in particular to a panel assembly that simulates the look of a real stained glass but with the ease to change colors and patterns and can easily be moved from one glass window to the other.

2. The Prior Arts

Stained glass is a work of art which provides profound artistic feelings. Such artworks can be found in cathedrals, with various themes, pictures and patterns, and present vivid bright colors when sunlight passes through them, which attract people to linger in front of them. The colored glass is crafted into stained glass windows in which small pieces of glass are arranged to form desired patterns or pictures, and held together by a metal frame.

However, when the stained glass is to be fabricated, patterns and colors of the stained glass generally have been pre-determined. After it was fabricated, the patterns and the colors could no longer be changed. It would be quite nice if the patterns and colors can be changed from time to time without changing the whole panel of glass. It is also more economical and feasible to have a changeable plastic panel giving the appearance of stained glass than to make an actual stained glass window. Furthermore, the conventional stained glass gives only two dimensional patterns, and not able to give viewers a vivid three dimensional impression.

SUMMARY OF THE INVENTION

A primary objective of the present invention is to provide a panel assembly to simulate the look of a real stained glass window and be capable of changing colors and patterns easily without changing the whole window panel.

The panel assembly according to the present invention is attached to one side of a pane of transparent glass. The panel assembly includes a panel piece having at least one through hole that forms a pattern or a character, and at least one embedding piece corresponding to the through hole. The embedding piece is fitted into the through hole of the panel piece.

The panel assembly according to the present invention makes the decoration of the transparent glass more flexible by means of replacing the embedding pieces with different colors or simply taking down the old panel assembly and assembling a new style of panel assembly onto the glass. In addition, the panel assembly provides a three-dimensional pattern, which gives viewers a vivid impression.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

Figure 1:
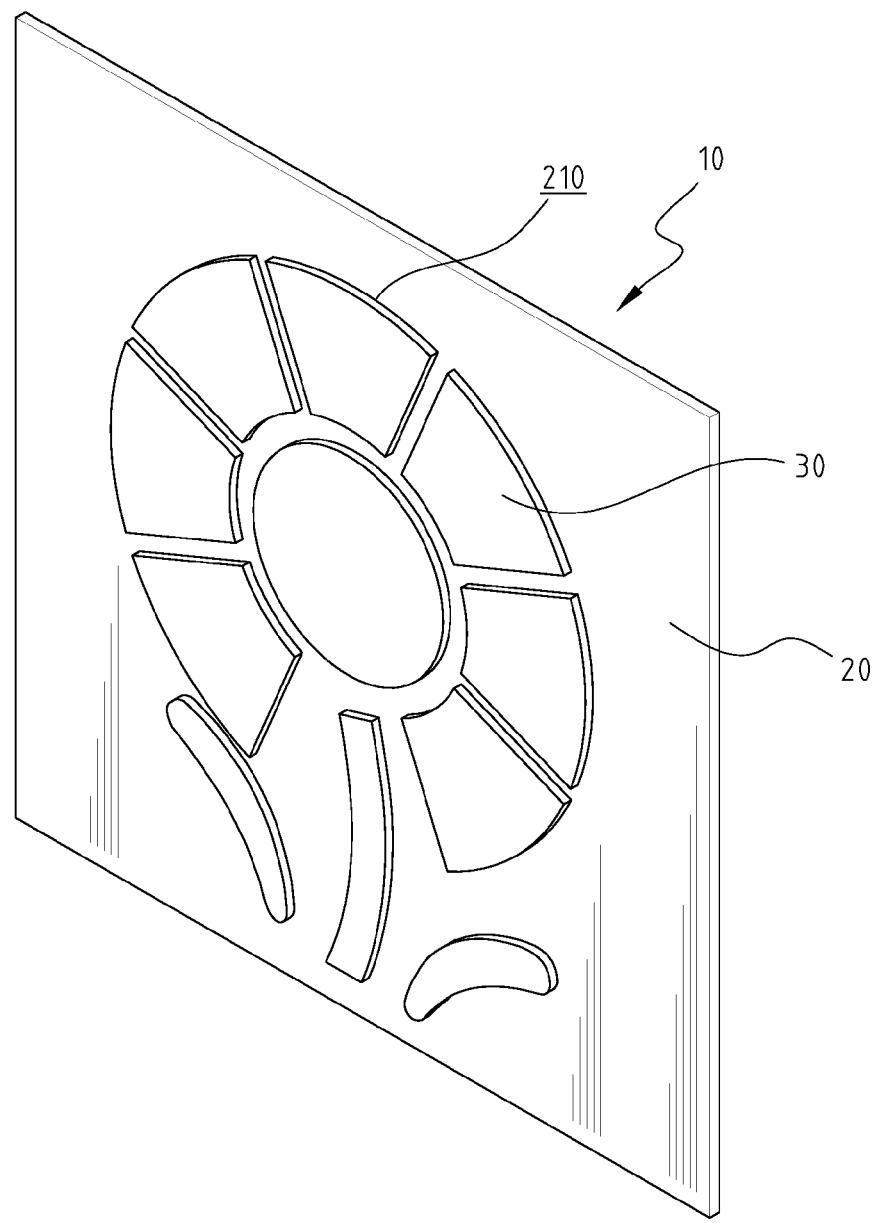
FIG. 1 is a schematic view showing a panel assembly for decoration glass according to the present invention.

Referring to FIG. 1, a panel assembly 10 for decoration glass according to the present invention comprises a panel piece 20 and a plurality of embedding pieces 30 embedded in the panel piece 20. A panel assembly 10 is configured with characters or patterns to provide aesthetic enhancement to the transparent glass or an advertising tool.

Figure 2:
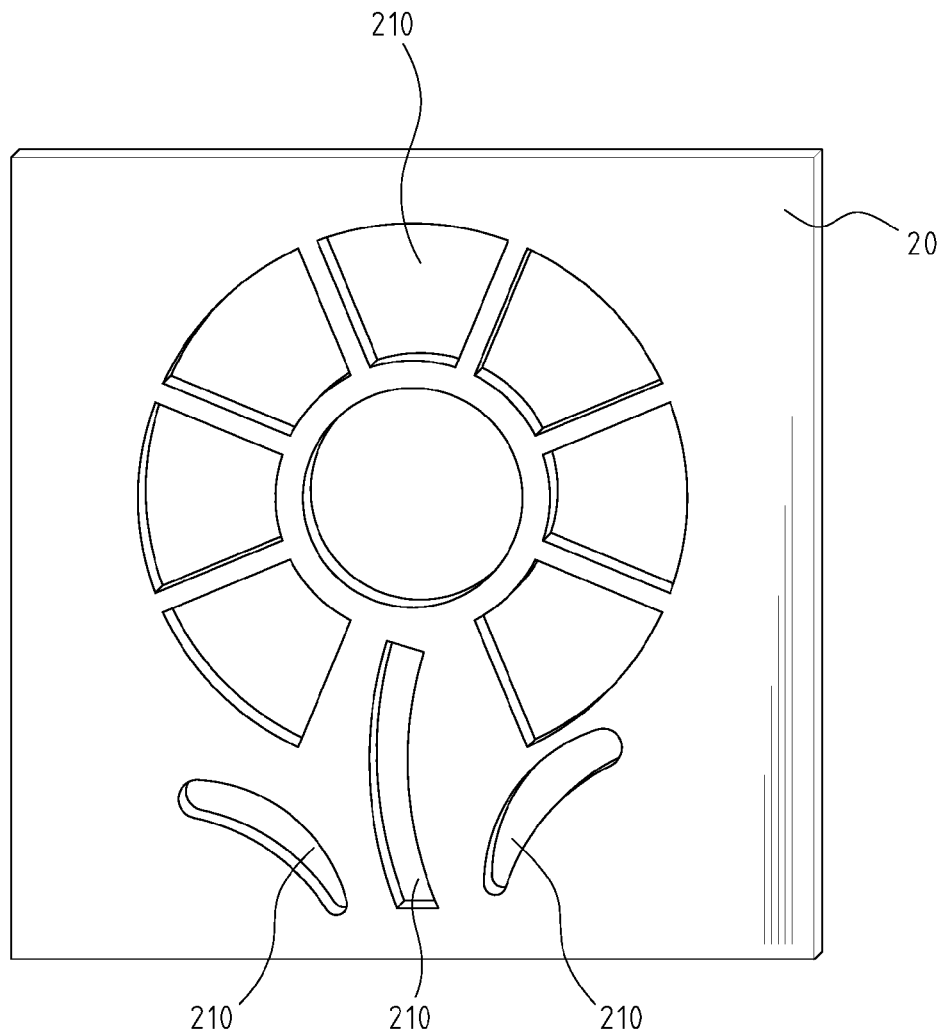
FIG. 2 is a schematic view showing a panel piece according to the present invention.
Figure 6:
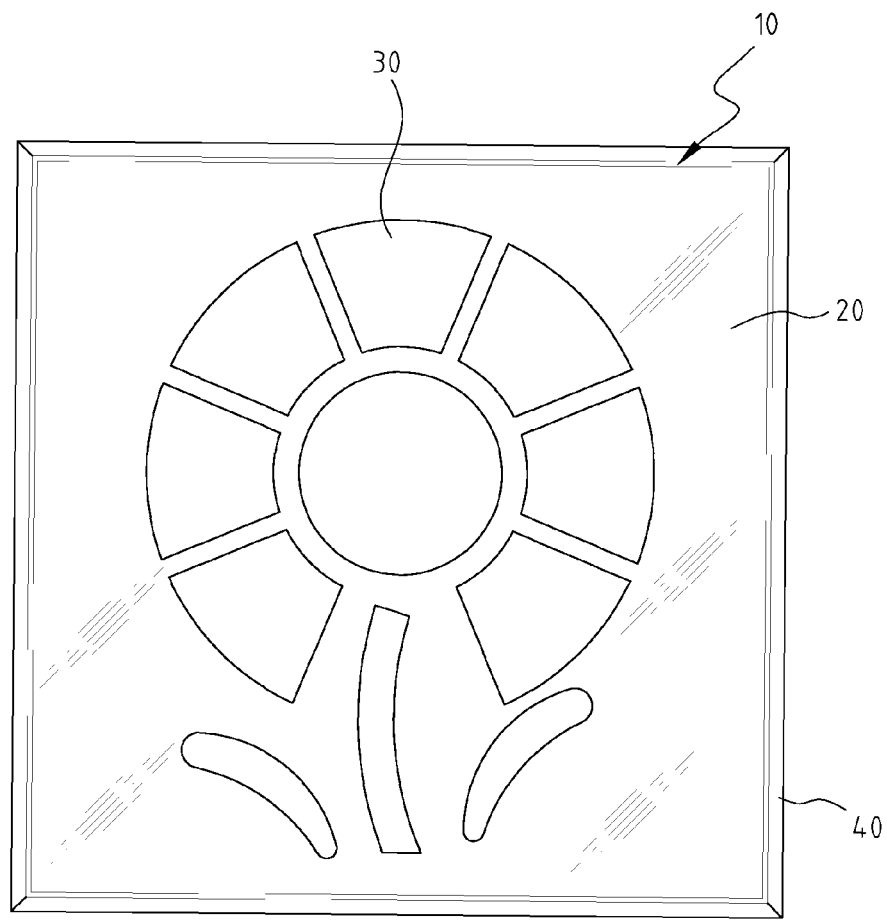
FIG. 6 is a front schematic view showing the panel assembly attached to the transparent glass.

Referring to FIG. 2, the panel piece 20 is a thin rectangular plastic plate whose size is slightly smaller than that of a piece of glass 40 (see FIG. 6). The panel piece 20 according to a first embodiment of the present invention is a black plastic plate or a plastic plate with other color. The panel piece 20 includes at least one through hole 210 passing through the panel piece 20. The through hole 210 forms a single pattern or a character, or a set of patterns or characters. In the first embodiment, the panel piece 20 includes eleven through holes 210, which form a flower pattern. The through holes 210 may also be arranged into other characters or patterns, such as a human figure, an article, etc.

Figure 3:
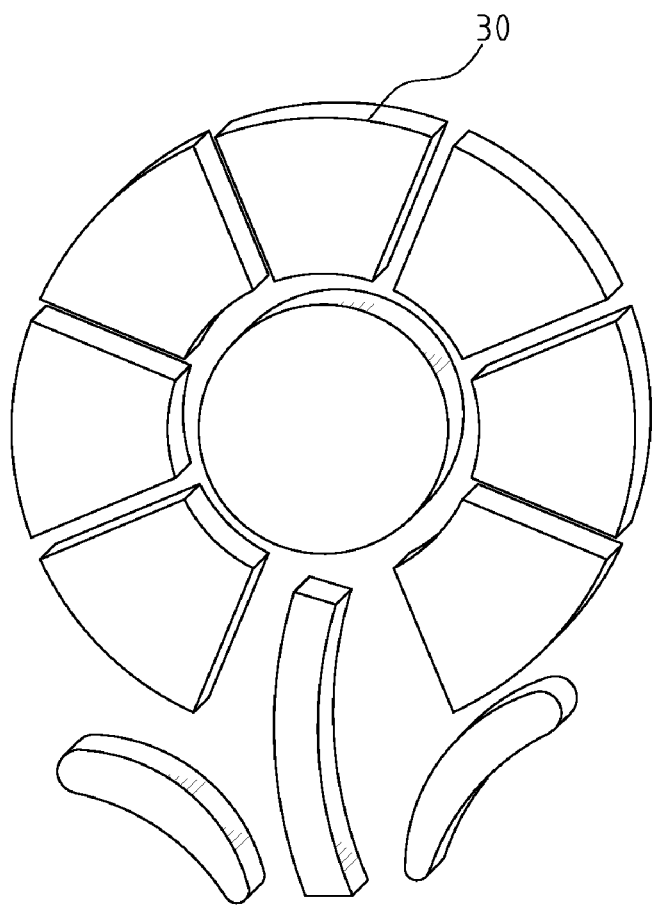
FIG. 3 is a schematic view showing embedding pieces corresponding to through holes of the panel piece, according to the present invention.
Figure 4:
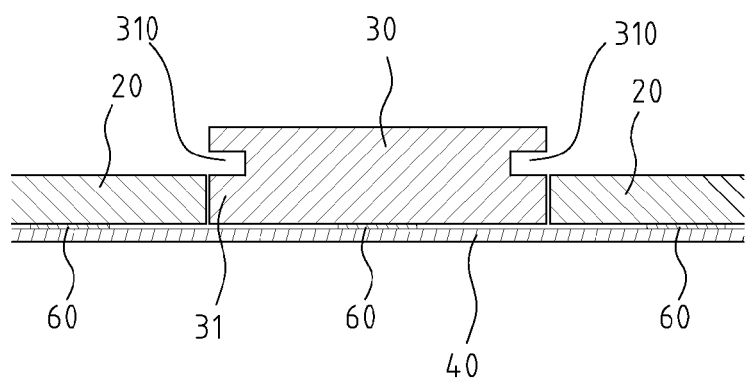
FIG. 4 is a schematic view showing the panel piece and the embedding piece attached to a piece of glass.

Referring to FIG. 3, the embedding pieces 30 according to the present invention are corresponding to the through holes 210. The embedding piece 30 is made of plastic material. The embedding piece 30 according to the first embodiment of the present invention is a colored transparent plastic block. In addition, the thickness of the embedding piece 30 is thicker than that of the panel piece 20 (see FIGS. 1 and 4). Referring to FIG. 4, the upper portion of the embedding piece 30 protrudes from the panel piece 20, and has a circumferential groove 310 defined at a side surface thereof. It is convenient for users to take out the embedding piece 30 by means of hooking the circumferential groove 310 of the embedding piece 30 and then pulling it out. The embedding piece 30 protrudes from the panel piece 20 when it is fitted in the through hole 210 of the panel piece 20. The panel piece is attached to the glass 40 by a transparent double sided tape or a re-adherable adhesive 60. Therefore, the embedding pieces 30 are formed as a three-dimensional flower pattern, and it is convenient to take out the embedding pieces 30. In addition, the embedding pieces 30 may have different colors, and each embedding piece 30 may be replaced with another identically-shaped one with different color. Thus, when the embedding pieces 30 are placed into the corresponding through holes 210 of the panel piece 20 respectively, the embedding pieces 30 form a color changeable pattern. According to the first embodiment of the present invention, the embedding pieces 30 fitted in the corresponding through holes 210 of the panel piece 20 are petals, leaves and a stem of a flower. The pattern of the flower may have red petals, green leaves, and brown stems. The embedding pieces 30 may be replaced with the pink petals, the dark green leaves, and the black stem. Therefore, the colors of the flower pattern are diverse.

Figure 5:
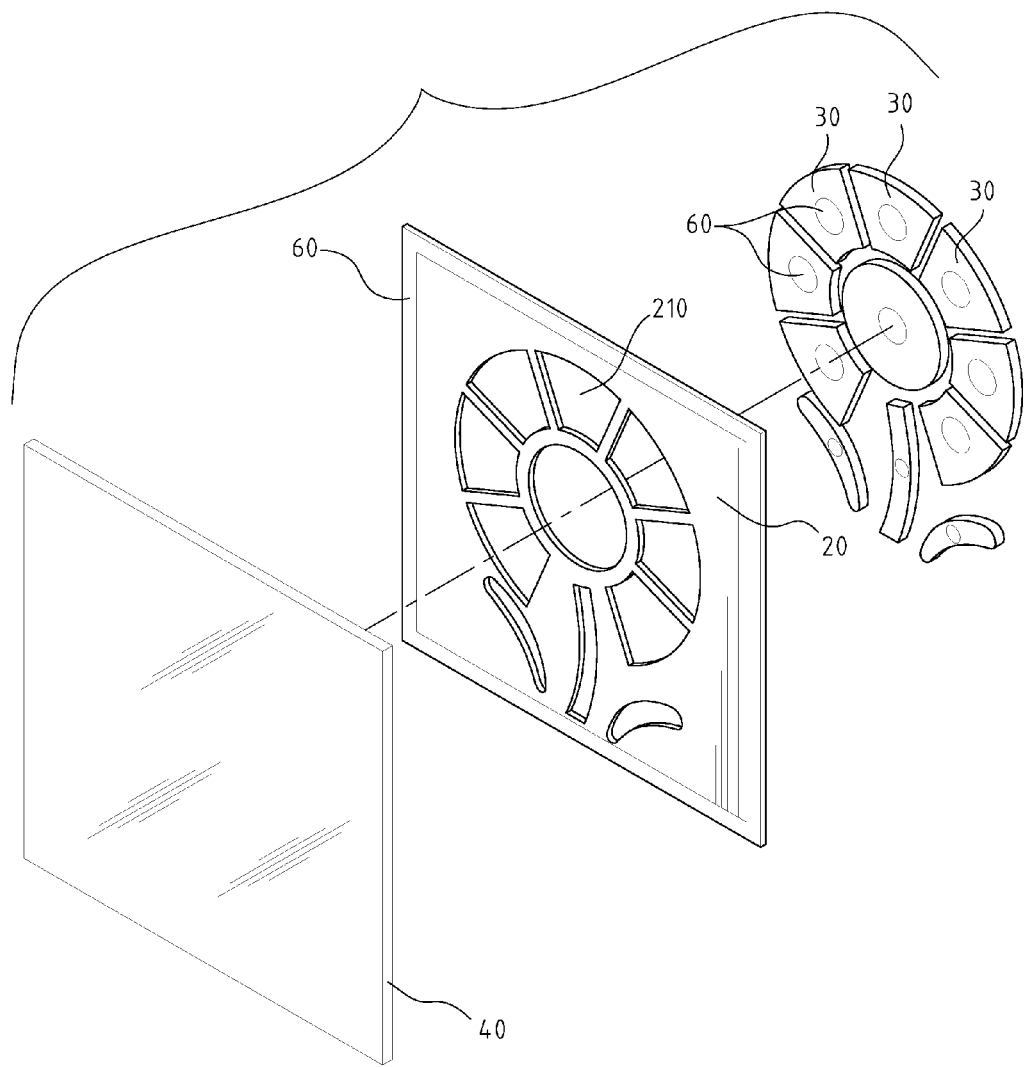
FIG. 5 is an exploded schematic view showing the glass, and the panel piece and the embedding pieces to be attached to the glass.

Referring to FIG. 5, when the panel assembly 10 according to the present invention is to be attached to the glass, firstly, a transparent double sided tape 60 is adhered along edges of the panel piece 20, and then the panel piece 20 is adhered onto the glass 40. Secondly, the double sided tape 60 is adhered to each embedding piece 30 at the side facing the panel piece 20 as shown in FIG. 5; then each embedding piece 30 is fitted into its corresponding through hole 210 respectively, and is attached to the glass 40 with the transparent double sided tape 60. Thus, it is completed to assemble the panel assembly 10 to the glass 40. For the purpose of illustration, an area is marked on each embedding piece 30 or the panel piece 20 as being adhered with the transparent double sided tape 60. However, it should be noted that the double sided tape is transparent and should be almost invisible. The panel piece 20 and the embedding pieces 30 may also be attached to the glass 40 by applying a re-adherable adhesive or other means to the marked area. Because the embedding piece 30 is thicker than the panel piece 20, the embedding piece 30 protrudes from the panel piece 20. Therefore, the embedding pieces 30 can be taken out easily and provide the panel assembly 10 with a vivid three dimensional appearance. In addition, assembling the embedding pieces 30 is just like playing a puzzle that provides children with entertainment and education. After completing the assembly, the color of the embedding pieces 30 can be changed according to desires, which may give a diverse appearance to the panel assembly 10.

FIG. 6 is a front schematic view showing the panel assembly 10 attached to the transparent glass. After the panel assembly 10 according to the present invention is attached to the glass 40, the glass 40 is provided with a colorful pattern. When people want to change the style or colors of the panel assembly 10, the embedding pieces 30 on the panel piece 20 can be replaced separately, or the panel piece 20 and the embedding pieces 30 can be changed together. Since the panel piece 20 and the embedding pieces 30 are removable and changeable, the same piece of glass 40 can have different colors and patterns with the replacement of different embedding pieces 30 or totally new panel assembly 10.

Figure 7:
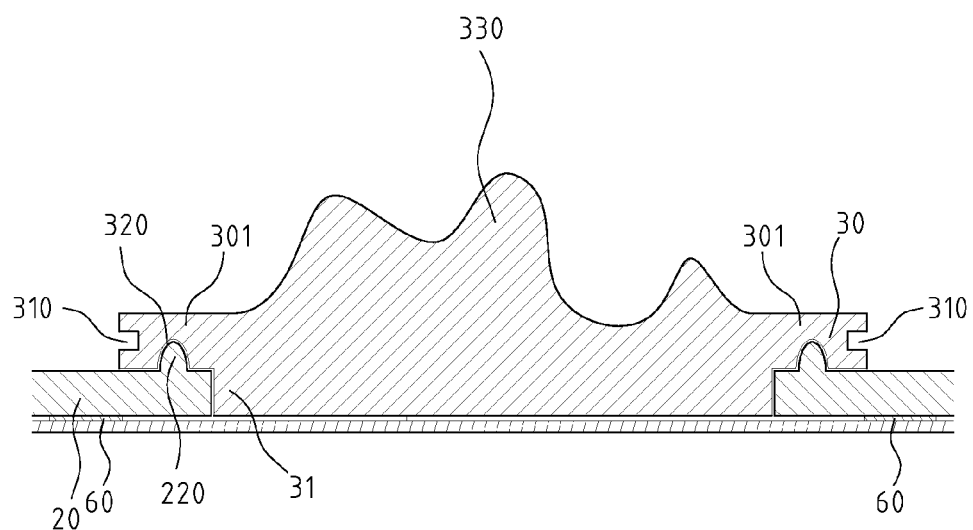
FIG. 7 is a schematic view showing the assembling of an embedding piece, a panel piece, and a piece of glass according to a second embodiment of the present invention.

The embedding piece 30 may be fitted into the through hole 210 of the panel piece 20 by means of tenon-mortise connection. Referring to FIG. 7, the embedding piece 30 according to a second embodiment of the present invention includes two edges 301 extended over the edges of the corresponding through hole, a plurality of grooves 320 defined at a bottom surface of the extended edges 301, and a circumferential groove 310 defined at a side surface thereof. The panel piece 20 includes a plurality of protrusions 220 corresponding to the grooves 320 defined at a top surface thereof. The protrusions 220 are fitted into the grooves 320 without using the double sided tape to attach the embedding pieces 30 to the panel piece 20. The panel piece 20 with the embedding pieces 30 embedded thereon is then attached to the glass 40. Moreover, the embedding pieces 30 may include a plurality of protruding portions 330 defined at a top surface thereof. The protruding portions 330 can be configured as different shapes, so as to present a three-dimensional pattern.

With reference to FIG. 4 and FIG. 7, in the present invention, the embedding piece 30 has an engaging portion 31. As can be seen from both figures, the perimeter of the engaging portion 31 is substantially identical to the perimeter of the corresponding through hole 210 of the embedding piece 30. When the embedding piece 30 is placed into the corresponding through hole 210, the engaging portion 31 is received and fitted into the through hole 210 of the panel piece 20. The lower surface of the embedding piece 30 and the lower surface of the panel piece 20 are removably and replaceably attached to a side of the glass by one of a transparent double sided tape and a re-adherable adhesive with the upper surface of the embedding piece 30 protruded above the upper surface of the panel piece 20.

Figure 8:
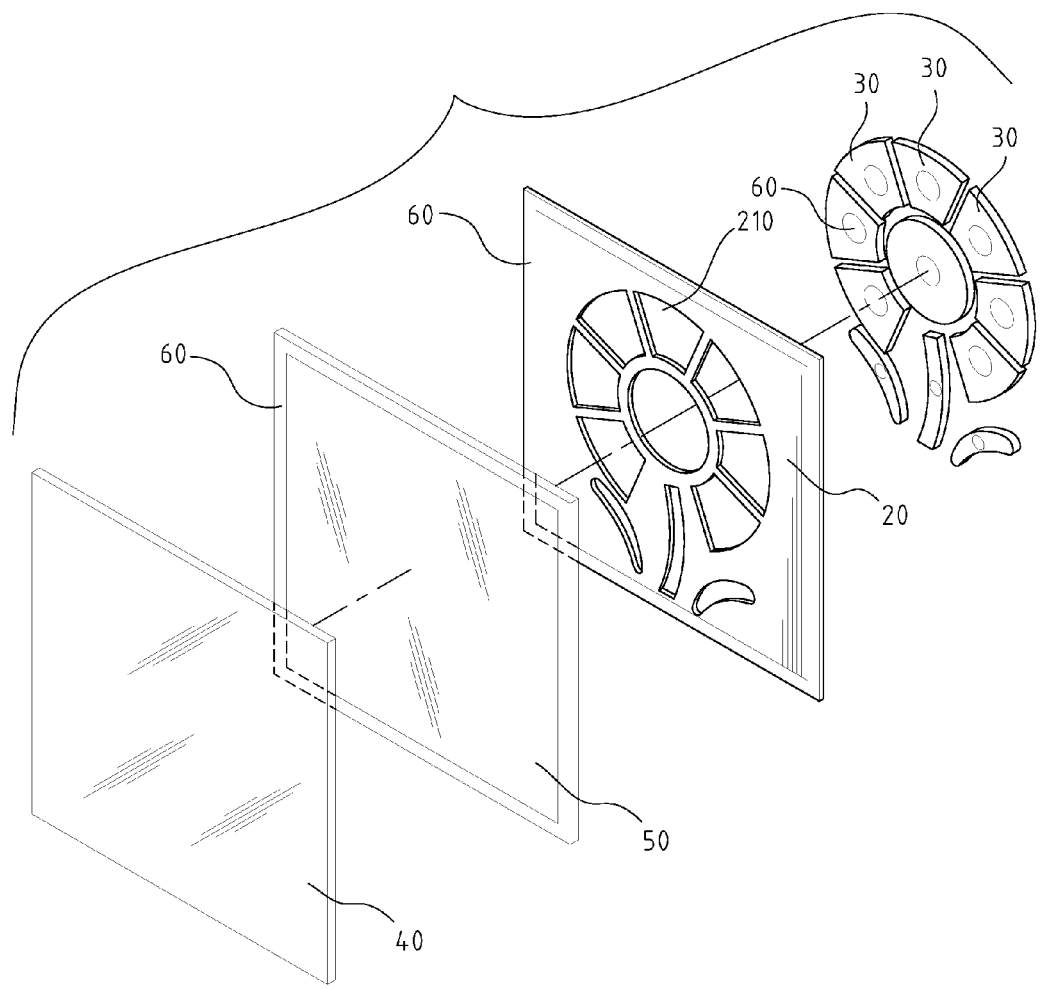
FIG. 8 is an exploded schematic view showing a glass, a transparent plate, a panel piece, and embedding pieces according to a third embodiment of the present invention.

Referring to FIG. 8, a panel assembly 10 according to a third embodiment of the present invention further includes a transparent plate 50. The size of the transparent plate 50 is the same as that of the panel piece 20. The transparent plate 50 is disposed between the glass 40 and the panel piece 20. One side of the transparent plate 50 is attached to the glass 40, and the other side of the transparent plate 50 is attached to the panel piece 20 using a transparent double sided tape or re-adherable adhesive 60 as shown in FIG. 8. The transparent plate 50 may be made of polyethylene (PE), polystyrene (PS), or other transparent plastic material, thereby allowing the light passing through the transparent plate 50. When people want to change the pattern of the panel assembly 10 according to the first embodiment, it needs to remove the panel piece 20 and the embedding pieces 30 from the glass 40 piece by piece. Because the panel piece 20 and the embedding pieces 30 are adhered to the glass 40, it is time consuming and troublesome to remove them. The panel piece 20 and the embedding pieces 30 according to the third embodiment are attached to the transparent plate 50. Therefore, it only needs to remove the transparent plate 50, holding the panel piece 20 and the embedding pieces 30, from the glass 40. The removed transparent plate 50, holding the panel piece 20 and the embedding pieces 30, can be directly attached to another glass 40 without assembling the panel piece 20 and the embedding pieces 30 again. It saves a lot of time.

In summary, the panel assembly 10 according to the present invention makes the decoration of the transparent glass 40 more flexibly by means of replacing the embedding pieces 30 with different colors or replacing the panel assembly 10 with a new pattern. In addition, the panel assembly 10 provides a three dimensional pattern, which gives viewers a vivid impression.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A panel assembly for decoration glass, comprising:
   a panel piece attached to a pane of transparent glass, the panel piece having an upper surface, a lower surface and a plurality of through holes defined thereon and configured as a pattern or a character; and
   a plurality of embedding pieces disposed on the panel piece, each embedding piece having an upper surface, a lower surface and an engaging portion, and corresponding to a through hole on the panel piece;
   wherein each embedding piece is disposed on the panel piece, the engaging portion is fitted into and received in the corresponding through hole, the lower surface of the panel piece and the lower surface of each embedding piece are removably and replaceably attached to a same side of the transparent glass by one of a transparent double sided tape and a re-adherable adhesive with the upper surface of the embedding piece protruded above the upper surface of the panel piece, and each embedding piece further has a thickness slightly thicker than the panel piece and a groove defined on a circumferential side surface so as to be easily removed from the panel piece.

2. The panel assembly as claimed in claim 1, wherein each embedding piece has one of a three dimensional pattern and a character defined at the upper surface thereof.

3. A panel assembly for decoration glass, comprising:
a panel piece attached to a pane of transparent glass, the panel piece having an upper surface, a lower surface and a plurality of through holes defined thereon and configured as a pattern or a character; and
a plurality of embedding pieces disposed on the panel piece, each embedding piece having an upper surface, a lower surface and an engaging portion, and corresponding to a through hole on the panel piece;
wherein each embedding piece is disposed on the panel piece, the engaging portion is fitted into and received in the corresponding through hole, the lower surface of the panel piece and the lower surface of each embedding piece are removably and replaceably attached to a same side of the transparent glass by one of a transparent double sided tape and a re-adherable adhesive with the upper surface of the embedding piece protruded above the upper surface of the panel piece, each embedding piece further includes a plurality of edges extended above the engaging portion over the edges of the corresponding through hole and a plurality of grooves formed at a bottom surface of the extended edges thereof, and the panel piece includes a plurality of protrusions at the upper surface thereof for engaging with the grooves.

4. The panel assembly as claimed in claim 1, wherein the groove defined on the circumferential side surface of each embedding piece is a circumferential groove.

5. The panel assembly as claimed in claim 3, wherein each embedding piece has a thickness slightly thicker than the panel piece, so as to be able to be easily taken out from the panel piece.

6. The panel assembly as claimed in claim 5, wherein each embedding piece has a circumferential groove so as to be able to be easily taken out from the panel piece.

7. A panel assembly for decoration glass, comprising:
a panel piece having an upper surface, a lower surface and a plurality of through holes defined thereon and configured as a pattern or a character;
a plurality of embedding pieces disposed on the panel piece, each embedding piece having an upper surface, a lower surface and an engaging portion, and corresponding to a through hole on the panel piece;
a pane of transparent glass; and
a transparent plate disposed between the panel piece and the transparent glass with one side attached to the panel piece and the other side attached to the transparent glass;
wherein each embedding piece is disposed on the panel piece, the engaging portion is fitted into and received in the corresponding through hole, and the lower surface of the panel piece and the lower surface of each embedding piece are removably and replaceably attached to a same side of the transparent plate by one of a transparent double sided tape and a re-adherable adhesive with the upper surface of the embedding piece protruded above the upper surface of the panel piece, and each embedding piece further has a thickness slightly thicker than the panel piece and a groove defined on a circumferential side surface so as to be easily removed from the panel piece.

8. A panel assembly for decoration glass, comprising:
a panel piece having an upper surface, a lower surface and a plurality of through holes defined thereon and configured as a pattern or a character;
a plurality of embedding pieces disposed on the panel piece, each embedding piece having an upper surface, a lower surface and an engaging portion, and corresponding to a through hole on the panel piece;
a pane of transparent glass; and
a transparent plate disposed between the panel piece and the transparent glass with one side attached to the panel piece and the other side attached to the transparent glass;
wherein each embedding piece is disposed on the panel piece, the engaging portion is fitted into and received in the corresponding through hole, the lower surface of the panel piece and the lower surface of each embedding piece are removably and replaceably attached to a same side of the transparent plate by one of a transparent double sided tape and a re-adherable adhesive with the upper surface of the embedding piece protruded above the upper surface of the panel piece, each embedding piece further includes a plurality of edges extended above the engaging portion over the edges of the corresponding through hole and a plurality of grooves formed at a bottom surface of the extended edges thereof, and the panel piece includes a plurality of protrusions at the upper surface thereof for engaging with the grooves.

9. The panel assembly as claimed in claim 7, wherein the groove defined on the circumferential side surface of each embedding piece is a circumferential groove.

10. The panel assembly as claimed in claim 8, wherein each embedding piece has a thickness slightly thicker than the panel piece, so as to be able to be easily taken out from the panel piece.

11. The panel assembly as claimed in claim 10, wherein each embedding piece has a circumferential groove so as to be able to be easily taken out from the panel piece.

12. The panel assembly as claimed in claim 7, wherein each embedding piece has one of a three dimensional pattern and a character defined at the upper surface thereof.

* * * * *